United States Patent [19]

Ostrander

[11] Patent Number: 5,007,511
[45] Date of Patent: Apr. 16, 1991

[54] BI-DIRECTIONAL BACK STOPPING CLUTCH

[75] Inventor: Robert J. Ostrander, Sterling Heights, Mich.

[73] Assignee: Dana Corporation, Toledo, Ohio

[21] Appl. No.: 430,811

[22] Filed: Nov. 2, 1989

[51] Int. Cl.⁵ .............................................. F16D 51/12
[52] U.S. Cl. ........................................ 192/8 R; 192/7
[58] Field of Search .................... 192/7, 8 R; 188/74; 411/455

[56] References Cited

U.S. PATENT DOCUMENTS

| | | | |
|---|---|---|---|
| Re. 19,792 | 12/1935 | Rosenburg | 411/455 |
| Re. 26,540 | 3/1969 | Kalns | 192/7 |
| 318,566 | 5/1885 | Jones | 411/455 |
| 1,022,106 | 4/1912 | Murphy | 411/455 |
| 2,650,032 | 8/1953 | Godfrey | 411/455 |
| 2,812,044 | 11/1957 | Cole, Jr. | 192/8 |
| 3,051,282 | 8/1962 | Greene | 192/8 |
| 3,335,831 | 8/1967 | Kalns | 192/8 |
| 3,414,095 | 12/1968 | Kalns | 192/8 |
| 3,497,044 | 2/1970 | Kalns | 192/8 |
| 3,717,067 | 2/1973 | Vick et al. | 411/455 |
| 3,951,561 | 4/1976 | Speakman | 411/455 |
| 4,091,900 | 5/1978 | Murteza | 192/8 R |
| 4,245,728 | 1/1981 | Murteza | 192/8 R |
| 4,591,029 | 5/1986 | DaFoe | 188/134 |
| 4,712,550 | 12/1987 | Sinnett | 411/455 |

Primary Examiner—Rodney H. Bonck
Assistant Examiner—Nicholas Whitelaw
Attorney, Agent, or Firm—MacMillan, Sobanski & Todd

[57] ABSTRACT

A bi-directional back stopping clutch having improved output pins connecting between brake shoes and an output member. During driving, the output pins transfer torque to the output member. When a sufficient back driving force is applied to the output member, the output pins skew to move the brake shoes into contact with a brake drum. The contact surfaces between the pins and the output member and between the pins and the brake shoes are rounded and the spacings between the contact surfaces are adjusted to provide a desired braking action. In one embodiment, the contact surface between each pin and the output member is of a smaller diameter than the contact surfaces between the pin and the brake shoes.

8 Claims, 3 Drawing Sheets

5,007,511

BI-DIRECTIONAL BACK STOPPING CLUTCH

TECHNICAL FIELD

The invention relates to bi-directional back stopping clutches and more particularly to an improved output pin and to an improved method for adjusting the braking response in a bi-directional back stopping clutch.

BACKGROUND ART

In certain applications, it is desirable to have a bi-directional motor connected to rotate an output shaft in either direction. At the same time, it is undesirable to allow a load connected to the output shaft to transmit an excessive forward or reverse back drive torque to the motor. Bi-directional back drive stopping clutches have been developed to accomplish this desired function. Such clutches include a pair of brake shoes which do not interfere with bi-directional driving forces from the motor, but are moved to engage a stationary brake drum in response to excessive back drive torques. The brake shoes are generally semicircular having arcuate braking surfaces which when actuated engage the brake drum. The brake shoes may include hardened wear resistant inserts at the braking surfaces. The brake shoes are mounted in an opposing relationship to abut along a common boarder. Input pins or flanges on an input yoke engage the brake shoes to hold the shoes together clear of the brake drum as the input yoke is rotatably driven by a suitable drive mechanism such as a motor. Circular openings are formed between the brake shoes at locations equally spaced on opposite sides of the axis of rotation for the input yoke. A pair of output pins extend between these openings and aligned openings on an output member. The output member is connected to an output shaft. So long as the driving force is transferred to the brake shoes from the input yoke and an excessive back drive torque is not imparted to the output member by the output shaft, the brake shoes rotate and input torque is transferred through the output pins to the output member. In the event that an excessive back drive torque is applied to the output member, the pins are caused to skew, thus spreading the abutting brake shoes apart. A small separation of the brake shoes causes the braking surfaces on the brake shoes to engage the brake drum to prevent back driving of the motor. The clutch is effective both to brake reverse feedback in the driving phase against a strongly opposing load and to brake under an excessive forward or aiding load condition which could otherwise cause run-away.

It has been known in the art that the effectiveness of the clutch is influenced by the design of the output pins and the pin openings between the brake shoes. Prior art output pins and pin openings between the brake shoes are shown, for example, in U.S. Pat. Nos. 3,335,831, 3,414,095 and 3,497,044. In the past, the output pins have had a generally cylindrical body with a quasi-spherical head at the end which fits into an output member opening. The spherical head allows the pin to tilt or skew in the output member opening sufficiently to engage the brake without interference between the skewed pins and the output member. The portion of the pin between the brake shoes has been formed with a uniform cylindrical body terminating at a flat end.

It is known that the output pins connected between the brake and the output member operate as levers as they become skewed to activate the brake. The spherical end of each output pin engages the output member and the body of the skewed pin engages the two brake shoes at spaced apart locations. The point nearest the output member where the pin first contacts one of the brake shoes is the fulcrum of the lever. In the past, the leverage ratio has been changed to modify the braking response of the clutch by enlarging the end of the pin opening between the abutting brake shoes adjacent the output member, as shown in U.S. Pat. No. 3,497,044. The enlarged opening end increases the distance between the point of contact of the pin with the output member and the closest point of contact between the pin and a brake shoe. At the same time, the points of contact between the pin and the two brake shoes are moved closer together. Thus, the fulcrum for the pin is moved away from the output member and towards the end of the pin located between the brake shoes when the end of the shoe openings adjacent the output member are enlarged.

There are several disadvantages to enlarging the end of the brake shoe opening to modify the leverage ratio. The leverage ratio must be considered as only a theoretical value for production clutches. The actual ratio in an assembled clutch is the result of the relative position of all the assembled components. The manufacturing tolerances required for each respective component results in an overall total assembly stack up tolerance. This total tolerance varies from one assembly to another. In addition, the total tolerance can vary within each clutch assembly due to internal clearances of the parts. The result of tolerance stack up and clearances can change the leverage ratio by a magnitude of upwards of a 25 to 30 percent difference compared to the theoretical value. This difference, in turn, leads to a variation in clutch torque capacity by the same corresponding percentage difference in leverage ratio. The resulting clutch torque capacity in an assembled clutch could be adjusted only through replacement of the brake shoes with a pair of shoes having a different dimensioned stepped opening. However, if other tolerances on the replacement shoes were not identical to the original shoes, the replacement shoes might not result in the desired torque capacity. The brake shoes are the most expensive part of the clutch and the manufacturing cost is increased when the end of the opening is enlarged. In order to try different leverage ratios to determine the most effective brake response for a particular application, many differently designed pairs of the expensive brake shoes must be manufactured. Another problem associated with the present design is in the design of the fulcrum on the output pin. Since the shoe fulcrum location is a closely held sharp transition location at a step in the brake shoe openings, high unit compressive loads occur at the fulcrum point. The high compressive loads can cause the fulcrum point to fracture, having an adverse affect on the overall performance of the clutch.

DISCLOSURE OF INVENTION

According to the invention, a bi-directional back stopping clutch is provided with an improved design output pin. The output pin is designed to provide rounded surfaces at the fulcrum point and the rounded fulcrum surface engages uniform cylindrical surfaces on the brake shoes to reduce the risk of the fulcrum fracturing under high loads. Further, the leverage ratio is controlled by dimensional changes on the output pin, rather than by enlarging the output opening on the brake shoes. Since the output pins are considerably less expensive to manufacture than the brake shoes, the cost for evaluating different leverage ratios in a particular application to obtain the optimum braking response is greatly reduced over the prior art method of manufacturing different sets of brake shoes.

In one embodiment, the output pin is constructed with a generally spherical head, as in the prior art. The end of the pin located in the brake shoe opening is formed with two annular ridges, one adjacent the end of the pin and the other spaced between the two ends of the pin. The annular ridge nearest the spherical head functions as the fulcrum. The leverage ratio for the clutch is determined by the locations of the spherical head and the two annular ridges on the output pin. The leverage ratio is not significantly affected by tolerance stack up on other components in the clutch. The leverage ratio is changed simply by changing the location of this annular ridge between the spherical head and the annular ridge at the other end of the pin.

In a modified embodiment, the output pin has a cylindrical body or shank located in the brake shoe openings and a predetermined transition region to a generally spherical head. The fulcrum is located at the point where the transition region joins the pin shank. A radius is provided on the pin at the fulcrum location to reduce stresses at the fulcrum. The transition length of the region is modified to move the location of the fulcrum for establishing a desired leverage ratio. A longer transition region moves the fulcrum point further from the spherical head and closer to the end of the pin in the brake shoe opening. Thus, for both output pin embodiments, the leverage ratio for a clutch can be modified simply by substituting relatively inexpensive output pins of different dimensions to obtain a desired braking response.

Accordingly, it is an object of the invention to provide an improved bi-directional back stopping clutch in which the braking response is easily modified.

Other objects and advantages of the invention will be apparent from the following detailed description and the accompanying drawings.

BEST MODES FOR CARRYING OUT THE INVENTION

Figure 1:
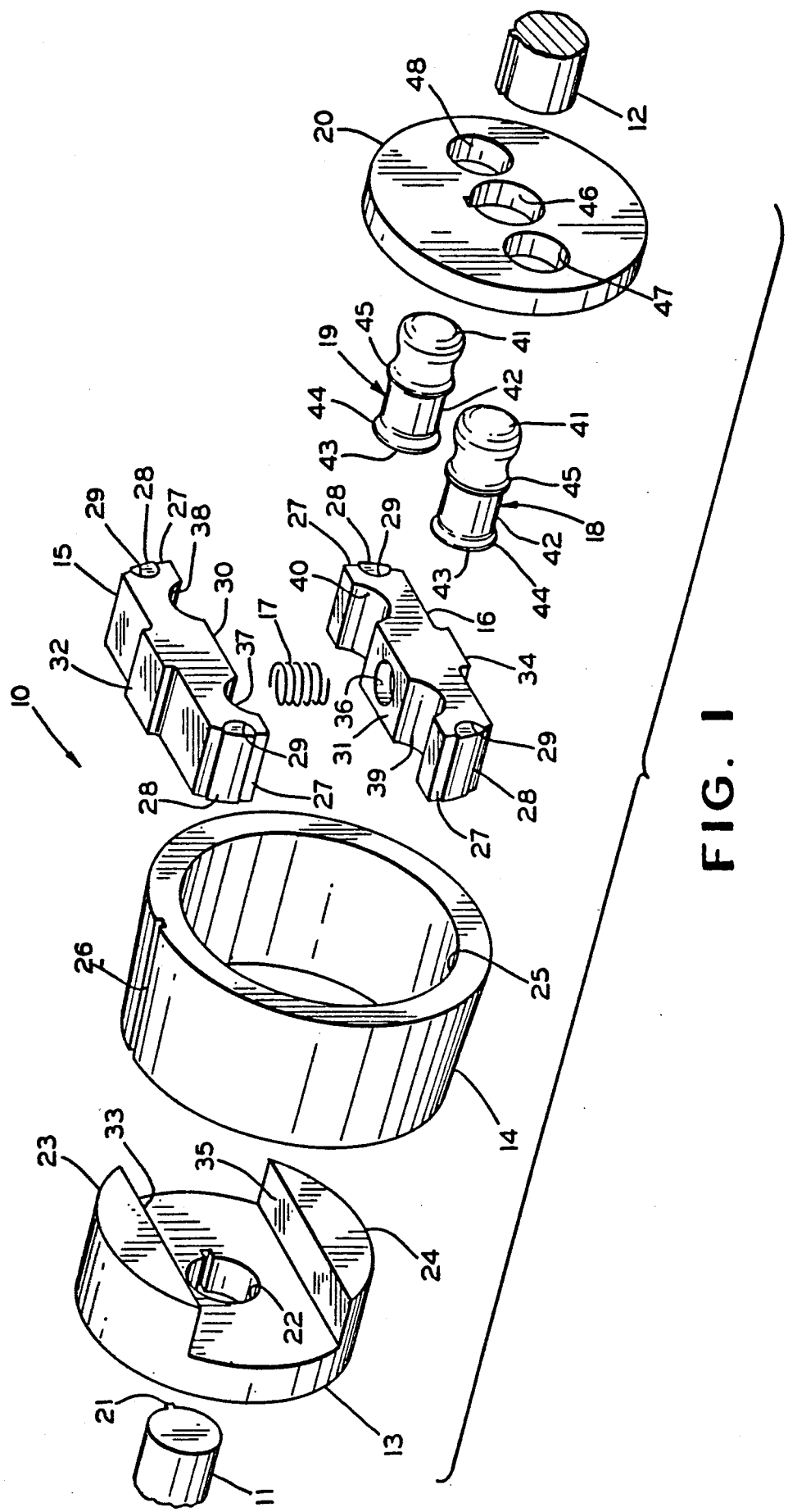
FIG. 1 is an exploded perspective view of an improved bi-directional back stopping clutch according to one embodiment of the invention.

Referring now to the drawings and particularly to FIG. 1, an exploded perspective view is shown of an improved bi-directional back stopping clutch 10 according to one embodiment of the invention. The clutch 10 is connected between an input shaft 11 and an output shaft 12. During normal operation, the clutch 10 connects a driving torque from the input shaft 11 to the output shaft 12. In the event that an excessive back drive torque is applied to the output shaft 12 by a load (not shown) connected to the output shaft 12, the clutch 10 establishes a braking force on the shafts 11 and 12.

The exemplary clutch 10 generally includes an input yoke 13, a brake drum 14, a pair of brake shoes 15 and 16, a compression spring 17, a pair of output pins 18 and 19 and an output member 20. The input shaft 11 is connected through a key 21 to a complementary keyed opening 22 at the center or axis of the input yoke 13. The input yoke 13 has two spaced projections 23 and 24 which may be in the form of cylindrical segments, as illustrated, or may be of other known designs, such as two pins as shown, for example, in U.S. Pat. No. 3,335,831 or four pins as shown in U.S. Pat. No. 3,414,095.

The brake drum 14 is a hollow cylinder having a central opening 25. The outer diameter of the input yoke 13 and the brake drum opening 25 are sized so that at least the projections 23 and 24 can extend into and rotate in the opening 25. A key slot 26 or other suitable means is provided on the brake drum 13 for securing the brake drum 13 against rotation.

The brake shoes 15 and 16 are generally semicircular and have arcuate surfaces 27 which are normally spaced from but close to the walls of the brake drum opening 25 when the clutch 10 is assembled. Optional replaceable hardened metal inserts 28 may be placed in slots 29 in the arcuate surfaces 27 to reduce wear during braking by the clutch 10 and also to reduce repair costs when the braking surfaces have become worn. The brake shoes 15 and 16 have flat surfaces 30 and 31, respectively, which face one another and are slightly spaced apart when the clutch 10 is assembled. The shoe 15 has a second flat surface 32 parallel to the surface 30 for normally abutting a surface 33 on the input yoke projection 23 and the shoe 16 has a second flat surface 34 parallel to the surface 31 for normally abutting a surface 35 on the input yoke projection 24. The spring 17 is located between a blind opening 36 in the center of the surface 31 on the brake shoe 16 and a similar opening (not shown) in center of the surface 30 on the brake shoe 15 to urge the shoes 15 and 16 away from each other and against the input yoke surfaces 33 and 35, respectively.

Two semi-circular grooves 37 and 38 are formed in the brake shoe surface 30 and two similar semi-circular grooves 39 and 40 are formed in the brake shoe surface 31. When the brake shoe surfaces 30 and 31 are placed together, the grooves 37 and 39 align to form a straight cylindrical opening between the shoes 15 and 16 for receiving the output pin 18 and the grooves 38 and 40 align o form a straight cylindrical opening between the shoes 15 and 16 for receiving the output pin 19. The two brake shoe openings for the pins 18 and 19 are located equal distance on opposite sides of the center or axis or rotation for the brake shoes 15 and 16. Further, such brake shoe openings are located on the surfaces 30 and 31 further from the axis of rotation of the brake shoes 15 and 16 than perpendicular projections from the surfaces 32 and 34 onto the surfaces 30 and 31. As a consequence, if a sufficient force is exerted on either of the grooves 37 or 38 in a direction perpendicular to the surface 30, the brake shoe 15 will rotate or tilt relative to the input yoke projection 23. Similarly, if a sufficient force is exerted on either of the grooves 39 or 40 in a direction perpendicular to the surface 31, the brake shoe 16 will rotate or tilt relative to the input yoke projection 24.

The two pins 18 and 19 are identical. Each has a quasi-spherical head 41 on one end, a shank 42, and a second end 43. An enlarged diameter annular flange or ridge 44 is formed on the shank 42 adjacent the end 43 and a second enlarged diameter annular flange or ridge 45 is formed on the shank 42 at a predetermined location between the head 41 and the annular ridge 44. The annular ridges 44 and 45 are of a diameter for being received by the shoe openings formed by the grooves 37–40. When the clutch 10 is assembled, both annular ridges 44 and 45 on each pin 18 or 19 will be located within the openings between the shoes 15 and 16.

The output member 20 has a keyed central or axial opening 46 for engaging the output shaft 12. Spaced equal distance on opposite sides of the axial opening 46 are two openings 47 and 48. The opening 47 normally aligns with the brake shoe opening formed by the aligned grooves 37 and 39 for receiving the head 41 on the output pin 18. Similarly, the opening 48 normally aligns with the brake shoe opening formed by the aligned grooves 38 and 40 for receiving the head 41 on the output pin 19.

During normal operation of the clutch 10, there is insufficient back drive force on the output shaft 12 to engage the brake formed by the brake shoes 15 and 16 and the brake drum 14. Torque applied through the input shaft 11 to the input yoke 13 is transferred through the projections 23 and 24 to rotate the brake shoes 15 and 16. As the brake shoes 15 and 16 rotate, the torque is transferred through the output pins 18 and 19 to the output member 20 and the attached output shaft 12. The output pins 18 and 19 will normally remain parallel to the axis of rotation of the clutch 10 and to the axis of the pin openings formed between the brake shoes 15 and 16. If a sufficient back driving torque is applied to the output shaft 12 relative to the input shaft 11, the output member 20 will tend to rotate relative to the brake shoes 15 and 16. This relative rotation causes the pins 18 and 19 to become skewed and to function as lever arm forcing the brake shoes to rotate relative to the input member projections 23 and 24. As a consequence, one of the arcuate surfaces 27 or one of the inserts 28 on each brake shoe 15 and 16 will move into frictional contact with the wall of the brake drum opening 25 to impart a braking action. The braking action will be a function of the amount of back drive torque on the output shaft 12. It will be appreciated that the braking action will occur regardless of the direction in which the input shaft 11 is rotated and regardless of the direction of the back drive torque on the output shaft 12.

Figure 2:
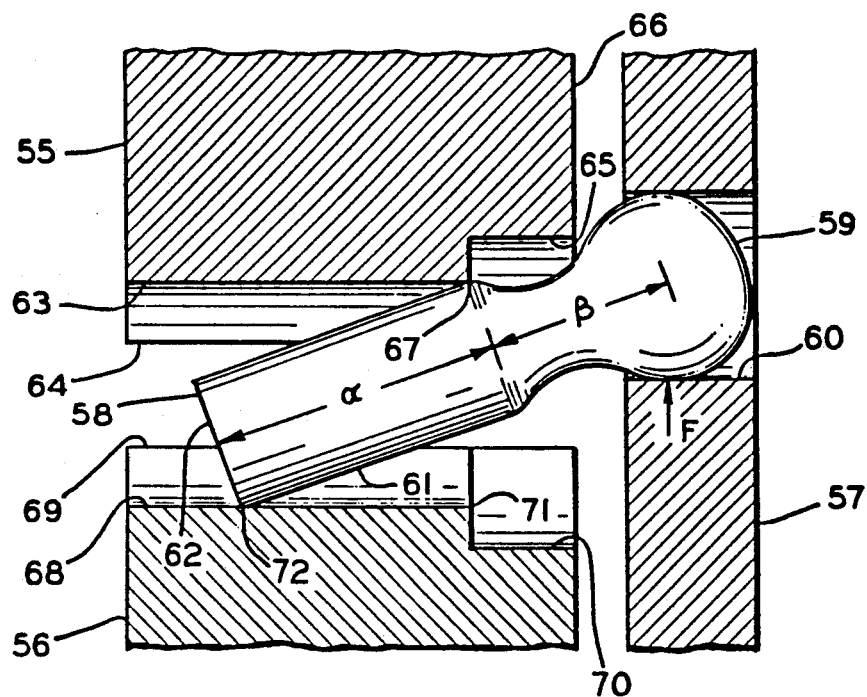
FIG. 2 is an enlarged fragmentary cross sectional view through two actuated brake shoes, an adjacent output member and an output pin according to the prior art.

The output pins act as levers rotating about a fulcrum for engaging the brake shoes. The braking response is controlled by the leverage ratio of the output pins. FIG. 2 is an enlarged fragmentary cross sectional view through two brake shoes 55 and 56, an output member 57 and a prior art output pin 58. The output pin 58 has a quasi-spherical head 59 which is disposed in an opening 60 in the output member 57. The output pin 58 further has a cylindrical shank 61 terminating at an end 62. The brake shoe 55 has a semicircular groove 63 formed in a surface 64. The groove 63 has an enlarged diameter portion 65 formed at its end adjacent a surface 66 next to the output member 57. Thus, a sharp step or edge 67 is formed where the diameter of the groove 63 changes. Similarly, the brake shoe 56 has a semi-circular groove 68 formed in a surface 69 to align with the groove 63 and the groove 68 has an enlarged diameter portion 70 aligned with the enlarged diameter portion 65. A sharp edge 71 is formed between the groove 68 and the enlarged diameter portion 65. The grooves 63 and 68 align to form an opening which receives the output pin shank 61.

When a back torque is applied on the output member 57 relative to the input torque, as represented by the arrow F, the output member 57 tends to move relative to the brake shoes 55 and 56. In the illustrated embodiment, the force F moves the output member 57 in an upward direction. If the direction of the back drive torque is reversed, the output member 57 will move in a downward direction relative to the brake shoes 55 and 56. This causes the pin 58 to skew in the opening between the brake shoes 55 and 56 formed by the grooves 63 and 68. As the pin 58 becomes skewed when the output member 57 moves upward relative to the brake shoes 55 and 56 as illustrated in FIG. 2, the output pin 58 acts as a lever pivoting about a fulcrum formed by the sharp edge 67. At one end of the lever, the force F is applied by the output member 57 on the pin head 59. At the other end of the lever, the end 62 of the pin 58 pushes against the brake shoe 56 at point 72 to cause the brake shoe 56 to rotate until its braking surface engages the brake drum. The distance, as measured along the axis of the pin, between the force F at the point of contact between the output member 57 and the pin head 59 to the point of contact between the pin shank 61 and the edge 67 is designated $\beta$ and the axial distance between the point of contact between the pin shank 61 and the edge 67 to the point of contact 72 between the pin 58 and the brake shoe 56 is designated $\alpha$. The leverage ratio which determines the braking response of the clutch is equal to $\beta/\alpha$. It can be seen that the leverage ratio can be changed by only by changing the depth of the enlarged diameter end portions 65 and 70 of the brake shoe grooves 63 and 68, respectively. It also is apparent that the edges 67 and 71 will be high stress points subject to damage under heavy back torque loads.

Figure 3:
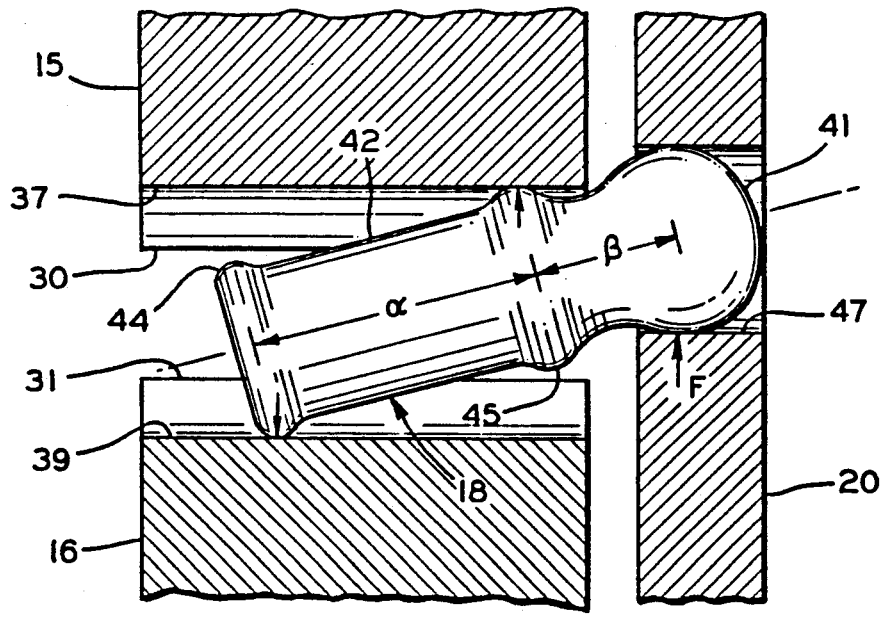
FIG. 3 is an enlarged fragmentary cross sectional view through the two actuated brake shoes, the adjacent output member and an output pin according to one embodiment of the invention.

FIG. 3 is an enlarged fragmentary cross sectional view through a portion of the brake shoes 15 and 16, the output member 20 and the output pin 18. It will be seen that the grooves 37 and 39 can be made with a uniform diameter throughout their lengths since the fulcrum point is not formed by a step in the groove. The walls of the grooves 37 and 39 are contacted only by the annular ridges 43 and 45 on the output pin 18. When a back drive torque represented by the arrow F tends to move the output member 20 upward relative to the brake shoes 15 and 16, the annular ridge 45 serves as a fulcrum point relative to the brake shoe 15. The pin 18 serves as a lever arm pivoting the brake shoe 16 relative to the input member projection 24 (FIG. 1). The leverage ratio is again $\beta/\alpha$ where $\alpha$ equals the axial distance between the annular ridges 43 and 45 and $\beta$ equals the axial distance between the annular ridge 45 and the center of the spherical head 41 on the pin 18.

Figure 4:
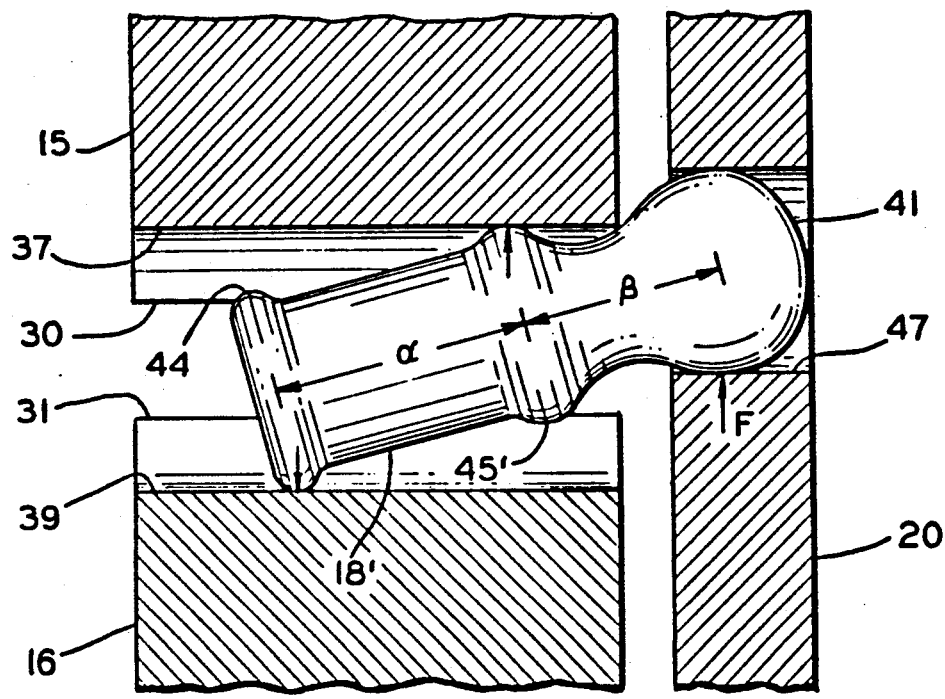
FIG. 4 is an enlarged fragmentary cross sectional view, similar to FIG. 3, but with the dimensions of the output pin modified to provide a different leverage ratio.

As illustrated in FIG. 4, the leverage ratio $\beta/\alpha$ is readily modified by simple dimensional changes in the output pin 18'. The length of the pin 18', the spherical head 41 and the annular ridge 43 may be identical with the pin 18 in FIG. 3. Only the annular ridge 45' on the pin 18' in FIG. 4 is formed further from the head 41 and closer to the annular ridge 43 than for the pin 18 in FIG. 3. As a consequence, the pin 18' shown in FIG. 4 will have a greater leverage ratio than the pin 18 illustrated in FIG. 3. Thus, the leverage ratio, and hence the brake response, is easily adjusted by simply modifying the location of the annular ridge 45 on the output pins 18 and 19. Further, the leverage ratio for the assembled clutch is controlled by the spacings of the pin head 41 and the annular ridges 43 and 45 and is not significantly affected by the dimensional stack up on the clutch. Finally, it should be appreciated that the rounded annular ridge 45 which forms the fulcrums as the pins 18 and 19 become skewed is under less stress than the sharp edge at a step in the brake shoe openings which functioned as a fulcrum in prior art clutches.

Figure 5:
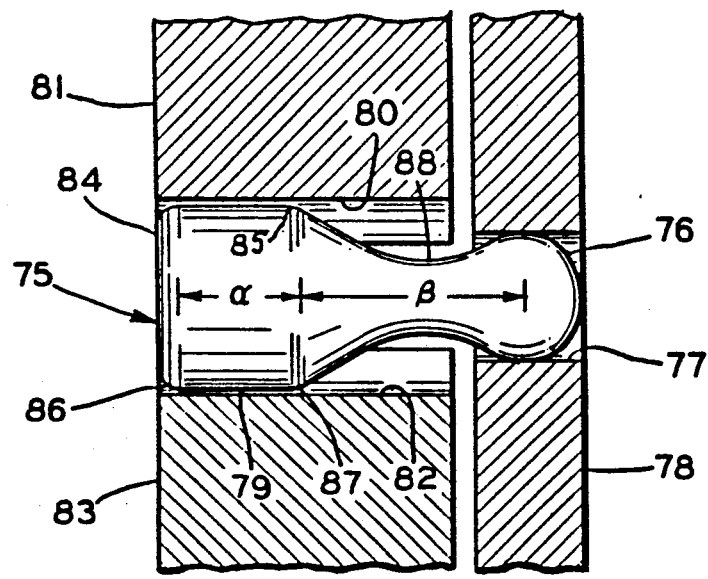
FIG. 5 is an enlarged fragmentary cross sectional view through the two brake shoes, the adjacent output member and an output pin according to a modified embodiment of the invention.

FIG. 5 illustrates a modified embodiment of an output pin 75. The pin 75 has a quasi-spherical head 76 located in an opening 77 in an output member 78. The pin 75 further has a cylindrical shank 79 located between a semi-circular groove 80 in a brake shoe 81 and a semi-circular groove 82 in a brake shoe 83. The pin shank 79 is of an axial length less than the thickness of the brake shoes 81 and 83. The shank 79 extends from an end 84 on the pin 75 to an annular region 85 about the pin 75. A small radius 86 is formed between the shank 79 and the end 84 and a small radius 87 is formed at the annular location 85. The radius 87 connects the shank 79 with a reduced diameter transition region 88 connecting with the spherical head 76.

When a back torque on the output member 78 moves the output member 78 relative to the brake shoes 81 and 83, the pin 75 begins to skew about a fulcrum formed by the radius 87. The leverage ratio again is equal to $\beta/\alpha$ where $\alpha$ is the axial distance on the pin 75 between the contact points on the radii 86 and 87 with the brake shoes 81 and 83 and $\beta$ is the axial distance on the pin 75 between the contact point on the radius 87 with one of the brake shoes 81 or 83 and the center of the spherical head 76. The leverage ratio is adjusted simply by adjusting the length of the pin shank 79 relative to the length of the transition region 88.

Preferably, the head 76 on the pin 75 is of a smaller diameter than the pin shank 79. The smaller head 76 and the reduced diameter of the transition region 88 provides clearance between the pin 75 and the brake shoes 81 and 83 when the pin becomes skewed. If the head 76 of the pin 75 is of the same diameter as the shank 79, it may be necessary to enlarge the diameter of the grooves 80 and 82 adjacent the output member 78 to provide adequate clearance since the fulcrum formed by the radius 87 is located inwardly from the end of the grooves 80 and 82.

It will be appreciated that various modifications and changes may be made in the above described preferred embodiments of the invention. For example, the improved output pins and method for adjusting the clutch response have been described is a specific clutch design as illustrated in FIG. 1. It will be appreciated that they may be adapted to other known clutch designs such as those illustrated in U.S. Pat. No. 3,335,831, 3,414,095, and 3,497,044, the disclosures of which are incorporated herein by reference. Various other modifications and changes also may be made without departing from the spirit and the scope of the following claims.

I claim:

1. In a bi-directional back stopping clutch including a brake drum, a pair of adjacent brake shoes located within said brake drum, said adjacent shoes defining two spaced openings therebetween, a pair of output pins having first ends located in said spaced openings and having second ends, an output member having a pair of spaced openings receiving said second pin ends, and means for applying a driving torque through said shoes and said pins to said output member, said pins skewing in response to a predetermined back driving torque on said output member to move said brake shoes in contact with said brake drum, the improvement wherein each pin has a first rounded surface located at the point of contact with said output member opening, a second rounded surface located at the point of contact with one of said shoes as said pin becomes skewed, and a third rounded surface located at the point of contact with the other of said shoes as said pin becomes skewed, and wherein said rounded surfaces are spaced to provide a predetermined leverage ratio $\beta/\alpha$, wherein $\beta$ equals the distance in the direction of the axis of such pin between said first and second rounded surfaces and $\alpha$ equals the axial distance on such pin between said second and third rounded surfaces, said pin having a smaller diameter at the location of said first rounded surface than at the locations of said second and third rounded surfaces.

2. An improved pin for a bi-directional back stopping clutch, as set forth in claim 1, wherein each pin, at said points of contact between such pin with said brake shoes and said output member, is rounded in a plane extending through the axis for such pin.

3. An improved pin for a bi-directional back stopping clutch, as set forth in claim 2, wherein each pin has annular ridges formed about its axis at the locations where such pin contacts said shoes when such pin is skewed.

4. In a bi-directional back stopping clutch including a brake drum, a pair of adjacent brake shoes located within said brake drum, said adjacent shoes defining two spaced openings therebetween, a pair of output pins having first ends located in said spaced openings and having second ends, an output member having a pair of spaced openings receiving said second pi ends, and means for applying a driving torque through said shoes and said pins to said output member, said pins skewing in response to a predetermined back driving torque on said output member to move said brake shoes into contact with said brake drum, the improvement to said pins comprising forming on each pin a first annular ridge about such pin adjacent said first end, forming an annular head on such pin adjacent said second end and forming a second annular ridge about such pin between said first and second ends, said first and second annular ridges being located within said brake shoe opening for such pin and forming spaced contact points between such pin and the adjacent brake shoes.

5. A bi-directional back stopping clutch comprising:
a hollow brake drum having a cylindrical inner surface;
a pair of opposed brake shoes disposed within said brake drum, said brake shoes including recesses formed therein which define at least one opening therebetween;
an input member engaged with said brake shoes for rotating said brake shoes within said brake drum;
an output member having at least one opening formed therein; and
an output pin having a head portion disposed within said output member opening and a shank portion disposed within said brake shoe opening, said pin skewing in response to a predetermined back driving torque on said output member to move said brake shoes into contact with said brake drum to prevent rotation, said shank portion having a first annular ridge formed thereon for engaging one of said brake shoes and a second annular ridge formed thereon for engaging the other of said brake shoes as said pin becomes skewed, said annular ridges being spaced apart from one another to provide a predetermined leverage ratio.

6. The invention defined in claim 5 wherein said brake shoes define two spaced openings therebetween, said output member has two spaced opening formed therein, and two of said output pins have respective head portions disposed within said output member openings and respective shank portions disposed within said brake shoe openings.

7. A bi-directional back stopping clutch comprising:
 a hollow brake drum having a cylindrical inner surface;
 a pair of opposed brake shoes disposed within said brake drum, said brake shoes including recesses formed therein which define at least one opening therebetween;
 an input member engaged with said brake shoes for rotating said brake shoes within said brake drum;
 an output member having at least one opening formed therein; and
 an output pin having a head portion disposed within said output member opening and a shank portion disposed within said brake shoe opening, said pin skewing in response to a predetermined back driving torque on said output member to move said brake shoes into contact with said brake drum to prevent rotation, said shank portion being generally cylindrical in shape and having a first end for engaging one of said brake shoes and a second end for engaging the other of said brake shoes as said pin becomes skewed, said ends being spaced apart from one another to provide a predetermined leverage ratio, said head portion being smaller in diameter than said shank portion.

8. The invention defined in claim 7 wherein said brake shoes define two spaced openings therebetween, said output member has two spaced openings formed therein, and two of said output pins have respective head portions disposed within said output member openings and respective shank portions disposed within said brake shoe openings.

* * * * *

UNITED STATES PATENT AND TRADEMARK OFFICE
CERTIFICATE OF CORRECTION

PATENT NO. : 5,007,511
DATED : April 16, 1991
INVENTOR(S) : Robert J. Ostrander

It is certified that error appears in the above-identified patent and that said Letters Patent is hereby corrected as shown below:

Column 8:
Claim 1, line 18, change "in" to -- into -- .

Claim 4, line 40, change "pi" to -- pin --.

Column 9:
Claim 6, line 14, change "opening" to -- openings --.

Signed and Sealed this

Eighteenth Day of August, 1992

Attest:

DOUGLAS B. COMER

Attesting Officer     Acting Commissioner of Patents and Trademarks